US012400613B2

(12) United States Patent
Dunn et al.

(10) Patent No.: US 12,400,613 B2
(45) Date of Patent: Aug. 26, 2025

(54) DISPLAY UNITS WITH AUTOMATED POWER GOVERNING

(71) Applicant: Manufacturing Resources International, Inc., Alpharetta, GA (US)

(72) Inventors: William Dunn, Alpharetta, GA (US); John Schuch, Buford, GA (US)

(73) Assignee: Manufacturing Resources International, Inc., Alpharetta, GA (US)

( * ) Notice: Subject to any disclaimer, the term of this patent is extended or adjusted under 35 U.S.C. 154(b) by 0 days.

(21) Appl. No.: 19/002,538

(22) Filed: Dec. 26, 2024

(65) Prior Publication Data

US 2025/0149005 A1 May 8, 2025

Related U.S. Application Data

(63) Continuation of application No. 18/885,160, filed on Sep. 13, 2024, now Pat. No. 12,217,713, which is a continuation of application No. 18/652,287, filed on May 1, 2024, now Pat. No. 12,118,953, which is a continuation of application No. 18/214,948, filed on Jun. 27, 2023, now Pat. No. 12,027,132.

(51) Int. Cl.
*G09G 3/36* (2006.01)
*G09G 1/00* (2006.01)

(52) U.S. Cl.
CPC ............... *G09G 3/36* (2013.01); *G09G 1/005* (2013.01); *G09G 2320/041* (2013.01); *G09G 2330/021* (2013.01)

(58) Field of Classification Search
CPC ............................................... G09G 2320/041
See application file for complete search history.

(56) References Cited

U.S. PATENT DOCUMENTS

| | | | |
|---|---|---|---|
| 3,504,528 | A | 4/1970 | Weinberg et al. |
| 3,807,220 | A | 4/1974 | Ottenstein et al. |
| 4,093,355 | A | 6/1978 | Kaplit et al. |
| 4,527,804 | A | 7/1985 | Spencer |
| 4,593,978 | A | 6/1986 | Mourey et al. |

(Continued)

FOREIGN PATENT DOCUMENTS

| | | | |
|---|---|---|---|
| CN | 203277867 | U | 11/2013 |
| CN | 112526806 | A | 3/2021 |

(Continued)

OTHER PUBLICATIONS

Novitsky, T. et al., Design How-To, Driving LEDs versus CCFLs for LCD backlighting, EE Times, Nov. 12, 2007, 6 pages, AspenCore.

(Continued)

*Primary Examiner* — Gustavo Polo
(74) *Attorney, Agent, or Firm* — Standley Law Group LLP; Jeffrey S. Standley; Adam J. Smith

(57) ABSTRACT

Display units for prioritizing requested operational updates are disclosed. A control subsystem is in electronic communication with an electronic display, sensor(s), and a thermal management subsystem. The control subsystem operates the display unit based on operational parameters which are specific to readings from the one or more sensors. Requests to update operational parameters for the display unit are received at the control subsystem and are prioritized for implementation.

17 Claims, 4 Drawing Sheets

(56) References Cited

U.S. PATENT DOCUMENTS 4,634,225 A 1/1987 Haim et al.
4,722,669 A 2/1988 Kundert
5,029,982 A 7/1991 Nash
5,086,314 A 2/1992 Aoki et al.
5,088,806 A 2/1992 McCartney et al.
5,162,785 A 11/1992 Fagard
5,168,961 A 12/1992 Schneider
5,228,339 A 7/1993 Maresca, Jr. et al.
5,247,374 A 9/1993 Terada
5,285,677 A 2/1994 Oehler
5,322,051 A 6/1994 Patterson et al.
5,351,201 A 9/1994 Harshbarger, Jr. et al.
5,559,614 A 9/1996 Urbish et al.
5,590,831 A 1/1997 Manson et al.
5,661,374 A 8/1997 Cassidy et al.
5,748,269 A 5/1998 Harris et al.
5,751,346 A 5/1998 Dozier et al.
5,767,489 A 6/1998 Ferrier
5,769,705 A 6/1998 O'Callaghan et al.
5,783,909 A 7/1998 Hochstein
5,786,801 A 7/1998 Ichise
5,808,418 A 9/1998 Pitman et al.
5,818,010 A 10/1998 McCann
5,952,992 A 9/1999 Helms
5,991,153 A 11/1999 Heady et al.
6,042,443 A 3/2000 Carella et al.
6,085,152 A 7/2000 Doerfel
6,089,751 A 7/2000 Conover et al.
6,144,359 A 11/2000 Grave
6,153,985 A 11/2000 Grossman
6,157,143 A 12/2000 Bigio et al.
6,157,432 A 12/2000 Helbing
6,158,692 A 12/2000 Abild et al.
6,181,070 B1 1/2001 Dunn et al.
6,191,839 B1 2/2001 Briley et al.
6,215,411 B1 4/2001 Gothard
6,222,841 B1 4/2001 Taniguchi
6,259,492 B1 7/2001 Imoto et al.
6,292,228 B1 9/2001 Cho
6,297,859 B1 10/2001 George
6,374,187 B1 4/2002 Knight et al.
6,380,853 B1 4/2002 Long et al.
6,384,736 B1 5/2002 Gothard
6,388,388 B1 5/2002 Weindorf et al.
6,400,101 B1 6/2002 Biebl et al.
6,417,900 B1 7/2002 Shin et al.
6,421,694 B1 7/2002 Nawaz et al.
6,496,236 B1 12/2002 Cole et al.
6,509,911 B1 1/2003 Shimotono
6,526,807 B1 3/2003 Doumit et al.
6,535,266 B1 3/2003 Nemeth et al.
6,546,294 B1 4/2003 Kelsey et al.
6,553,336 B1 4/2003 Johnson et al.
6,556,258 B1 4/2003 Yoshida et al.
6,587,525 B2 7/2003 Jeong et al.
6,628,355 B1 9/2003 Takahara
6,701,143 B1 3/2004 Dukach et al.
6,712,046 B2 3/2004 Nakamichi
6,753,842 B1 6/2004 Williams et al.
6,762,741 B2 7/2004 Weindorf
6,771,795 B1 8/2004 Isnardi
6,809,718 B2 10/2004 Wei et al.
6,812,851 B1 11/2004 Dukach et al.
6,813,375 B2 11/2004 Armato III et al.
6,821,179 B2 11/2004 Ando
6,839,104 B2 1/2005 Taniguchi et al.
6,850,209 B2 2/2005 Mankins et al.
6,886,942 B2 5/2005 Okada et al.
6,891,135 B2 5/2005 Pala et al.
6,943,768 B2 9/2005 Cavanaugh et al.
6,955,170 B1 10/2005 Mullins et al.
6,968,375 B1 11/2005 Brown
6,982,686 B2 1/2006 Miyachi et al.
6,996,460 B1 2/2006 Krahnstoever et al.
7,007,545 B1 3/2006 Martinek
7,015,470 B2 3/2006 Faytlin et al.
7,064,672 B2 6/2006 Gothard
7,083,285 B2 8/2006 Hsu et al.
7,136,076 B2 11/2006 Evanicky et al.
7,307,614 B2 12/2007 Vinn
7,319,862 B1 1/2008 Lincoln et al.
7,324,080 B1 1/2008 Hu et al.
7,330,002 B2 2/2008 Joung
7,354,159 B2 4/2008 Nakamura et al.
7,380,265 B2 5/2008 Jensen et al.
7,391,317 B2 6/2008 Abraham et al.
7,447,018 B2 11/2008 Lee et al.
7,451,332 B2 11/2008 Culbert et al.
7,474,294 B2 1/2009 Leo et al.
7,480,042 B1 1/2009 Phillips et al.
7,516,223 B2 4/2009 Whitehead
7,518,600 B2 4/2009 Lee
7,577,458 B2 8/2009 Lin
7,581,094 B1 8/2009 Apostolopoulos et al.
7,595,785 B2 9/2009 Jang
7,612,278 B2 11/2009 Sitrick et al.
7,636,927 B2 12/2009 Zigmond et al.
7,639,220 B2 12/2009 Yoshida et al.
7,658,787 B2 2/2010 Morse et al.
7,675,862 B2 3/2010 Pham et al.
7,679,279 B2 3/2010 Kamio et al.
7,692,621 B2 4/2010 Song
7,751,813 B2 7/2010 Varanda
7,764,280 B2 7/2010 Shiina
7,774,633 B1 8/2010 Harrenstien et al.
7,795,574 B2 9/2010 Kennedy et al.
7,795,821 B2 9/2010 Jun
7,800,706 B2 9/2010 Kim et al.
7,804,477 B2 9/2010 Sawada et al.
7,882,728 B2 2/2011 Kizaki et al.
7,889,852 B2 2/2011 Whitehead
7,949,893 B1 5/2011 Knaus et al.
8,074,627 B2 12/2011 Siddiqui et al.
8,111,371 B2 2/2012 Suminoe et al.
8,144,110 B2 3/2012 Huang
8,175,841 B2 5/2012 Ooghe
8,212,921 B2 7/2012 Yun
8,218,812 B2 7/2012 Sugimoto et al.
8,248,203 B2 8/2012 Hanwright et al.
8,319,936 B2 11/2012 Yoshida et al.
8,325,057 B2 12/2012 Salter
8,336,369 B2 12/2012 Mahoney
8,441,574 B2 5/2013 Dunn et al.
8,483,554 B2 7/2013 Takimoto et al.
8,508,155 B2 8/2013 Schuch
8,601,252 B2 12/2013 Mendelow et al.
8,612,608 B2 12/2013 Whitehead
8,643,589 B2 2/2014 Wang
8,654,302 B2 2/2014 Dunn et al.
8,689,343 B2 4/2014 De Laet
8,700,226 B2 4/2014 Schuch et al.
8,767,165 B2 7/2014 Dunn
8,810,501 B2 8/2014 Budzelaar et al.
8,823,630 B2 9/2014 Roberts et al.
8,854,595 B2 10/2014 Dunn
8,881,576 B2 11/2014 Schwartz et al.
8,901,825 B2 12/2014 Reed
8,988,011 B2 3/2015 Dunn
9,026,686 B2 5/2015 Dunn et al.
9,147,194 B1 9/2015 Le et al.
9,363,262 B1 6/2016 Wilkes
9,400,192 B1 7/2016 Salser, Jr. et al.
9,445,470 B2 9/2016 Wang et al.
9,448,569 B2 9/2016 Schuch et al.
9,516,485 B1 12/2016 Bowers et al.
9,622,392 B1 4/2017 Bowers et al.
9,629,287 B2 4/2017 Dunn
9,760,151 B1 9/2017 Hou
9,881,528 B2 1/2018 Dunn
9,924,583 B2 3/2018 Schuch et al.
10,170,076 B2 1/2019 Wang et al.
10,174,519 B1 1/2019 Carpenter et al.
10,194,562 B2 1/2019 Shelnutt et al.
10,255,884 B2 4/2019 Dunn et al.

(56) References Cited

U.S. PATENT DOCUMENTS 10,311,763 B2 6/2019 Greenfield
10,321,549 B2 6/2019 Schuch et al.
10,409,544 B2 9/2019 Park et al.
10,412,816 B2 9/2019 Schuch et al.
10,440,790 B2 10/2019 Dunn et al.
10,578,658 B2 3/2020 Dunn et al.
10,593,175 B1 3/2020 Jennings et al.
10,607,520 B2 3/2020 Schuch et al.
10,795,413 B1 10/2020 Dunn
10,803,783 B2 10/2020 Wang et al.
10,858,886 B2 12/2020 Fasi et al.
10,860,141 B2 12/2020 Wang et al.
11,016,547 B2 5/2021 Whitehead et al.
11,131,453 B2 9/2021 Kim et al.
11,132,715 B2 9/2021 Menendez et al.
11,402,940 B2 8/2022 Dunn
11,645,029 B2 5/2023 Newnham et al.
11,803,344 B2 10/2023 Newnham et al.
11,965,804 B2 4/2024 Dunn et al.
11,972,672 B1 4/2024 Dunn
12,027,132 B1 7/2024 Dunn et al.
2002/0009978 A1 1/2002 Dukach et al.
2002/0019933 A1 2/2002 Friedman et al.
2002/0020090 A1 2/2002 Sanders
2002/0026354 A1 2/2002 Shoji et al.
2002/0050974 A1 5/2002 Rai et al.
2002/0065046 A1 5/2002 Mankins et al.
2002/0084891 A1 7/2002 Mankins et al.
2002/0101553 A1 8/2002 Enomoto et al.
2002/0112026 A1 8/2002 Fridman et al.
2002/0120721 A1 8/2002 Eilers et al.
2002/0126248 A1 9/2002 Yoshida
2002/0147648 A1 10/2002 Fadden et al.
2002/0152425 A1 10/2002 Chaiken et al.
2002/0154138 A1 10/2002 Wada et al.
2002/0163513 A1 11/2002 Tsuji
2002/0163916 A1 11/2002 Oskouy et al.
2002/0164962 A1 11/2002 Mankins et al.
2002/0167637 A1 11/2002 Burke et al.
2002/0190972 A1 12/2002 Ven de Van
2002/0194365 A1 12/2002 Jammes
2002/0194609 A1 12/2002 Tran
2003/0007109 A1 1/2003 Park
2003/0031128 A1 2/2003 Kim et al.
2003/0039312 A1 2/2003 Horowitz et al.
2003/0061316 A1 3/2003 Blair et al.
2003/0088832 A1 5/2003 Agostinelli et al.
2003/0097497 A1 5/2003 Esakov
2003/0098881 A1 5/2003 Nolte et al.
2003/0115591 A1 6/2003 Weissmueller, Jr. et al.
2003/0117714 A1 6/2003 Nakamura et al.
2003/0122810 A1 7/2003 Tsirkel et al.
2003/0132514 A1 7/2003 Liebeskind
2003/0161354 A1 8/2003 Bader et al.
2003/0177269 A1 9/2003 Robinson et al.
2003/0192060 A1 10/2003 Levy
2003/0196208 A1 10/2003 Jacobson
2003/0204342 A1 10/2003 Law et al.
2003/0214242 A1 11/2003 Berg-johansen
2003/0230991 A1 12/2003 Muthu et al.
2004/0032382 A1 2/2004 Cok et al.
2004/0036622 A1 2/2004 Dukach et al.
2004/0036697 A1 2/2004 Kim et al.
2004/0036834 A1 2/2004 Ohnishi et al.
2004/0113044 A1 6/2004 Ishiguchi
2004/0138840 A1 7/2004 Wolfe
2004/0158872 A1 8/2004 Kobayashi
2004/0165139 A1 8/2004 Anderson et al.
2004/0194131 A1 9/2004 Ellis et al.
2004/0201547 A1 10/2004 Takayama
2004/0210419 A1 10/2004 Wiebe et al.
2004/0243940 A1 12/2004 Lee et al.
2004/0252400 A1 12/2004 Blank et al.
2004/0253947 A1 12/2004 Phillips et al.
2005/0012734 A1 1/2005 Johnson et al.
2005/0024538 A1 2/2005 Park et al.
2005/0033840 A1 2/2005 Nisani et al.
2005/0043907 A1 2/2005 Eckel et al.
2005/0049729 A1 3/2005 Culbert et al.
2005/0070335 A1 3/2005 Jitsuishi et al.
2005/0071252 A1 3/2005 Henning et al.
2005/0073518 A1 4/2005 Bontempi
2005/0088984 A1 4/2005 Chin et al.
2005/0094391 A1 5/2005 Campbell et al.
2005/0123001 A1 6/2005 Craven et al.
2005/0127796 A1 6/2005 Olesen et al.
2005/0132036 A1 6/2005 Jang et al.
2005/0140640 A1 6/2005 Oh et al.
2005/0179554 A1 8/2005 Lu
2005/0184983 A1 8/2005 Brabander et al.
2005/0216939 A1 9/2005 Corbin
2005/0231457 A1 10/2005 Yamamoto et al.
2005/0242741 A1 11/2005 Shiota et al.
2005/0267943 A1 12/2005 Castaldi et al.
2005/0289061 A1 12/2005 Kulakowski et al.
2005/0289588 A1 12/2005 Kinnear
2006/0007107 A1 1/2006 Ferguson
2006/0022616 A1 2/2006 Furukawa et al.
2006/0038511 A1 2/2006 Tagawa
2006/0049533 A1 3/2006 Kamoshita
2006/0087521 A1 4/2006 Chu et al.
2006/0125773 A1 6/2006 Ichikawa et al.
2006/0130501 A1 6/2006 Singh et al.
2006/0150222 A1 7/2006 McCafferty et al.
2006/0160614 A1 7/2006 Walker et al.
2006/0197474 A1 9/2006 Olsen
2006/0197735 A1 9/2006 Vuong et al.
2006/0207730 A1 9/2006 Berman et al.
2006/0214904 A1 9/2006 Kimura et al.
2006/0215044 A1 9/2006 Masuda et al.
2006/0220571 A1 10/2006 Howell et al.
2006/0238531 A1 10/2006 Wang
2006/0244702 A1 11/2006 Yamazaki et al.
2006/0269216 A1 11/2006 Wiemeyer et al.
2007/0013828 A1 1/2007 Cho et al.
2007/0039028 A1 2/2007 Bar
2007/0047808 A1 3/2007 Choe et al.
2007/0152949 A1 7/2007 Sakai
2007/0153117 A1 7/2007 Lin et al.
2007/0154060 A1 7/2007 Sun
2007/0157260 A1 7/2007 Walker
2007/0168539 A1 7/2007 Day
2007/0171647 A1 7/2007 Artwohl et al.
2007/0173297 A1 7/2007 Cho et al.
2007/0200513 A1 8/2007 Ha et al.
2007/0214812 A1 9/2007 Wagner et al.
2007/0222730 A1 9/2007 Kao et al.
2007/0230167 A1 10/2007 McMahon et al.
2007/0237636 A1 10/2007 Hsu
2007/0242153 A1 10/2007 Tang et al.
2007/0247594 A1 10/2007 Tanaka
2007/0268234 A1 11/2007 Wakabayashi et al.
2007/0268241 A1 11/2007 Nitta et al.
2007/0273519 A1 11/2007 Ichikawa et al.
2007/0273624 A1 11/2007 Geelen
2007/0274400 A1 11/2007 Murai et al.
2007/0279369 A1 12/2007 Yao et al.
2007/0286107 A1 12/2007 Singh et al.
2007/0291198 A1 12/2007 Shen
2007/0297163 A1 12/2007 Kim et al.
2007/0297172 A1 12/2007 Furukawa et al.
2008/0008471 A1 1/2008 Dress
2008/0019147 A1 1/2008 Erchak et al.
2008/0024268 A1 1/2008 Wong et al.
2008/0034205 A1 2/2008 Alain et al.
2008/0037466 A1 2/2008 Ngo et al.
2008/0037783 A1 2/2008 Kim et al.
2008/0055297 A1 3/2008 Park
2008/0074382 A1 3/2008 Lee et al.
2008/0078921 A1 4/2008 Yang et al.
2008/0084166 A1 4/2008 Tsai
2008/0104631 A1 5/2008 Krock et al.
2008/0111958 A1 5/2008 Kleverman et al.
2008/0112601 A1 5/2008 Warp

(56) References Cited

U.S. PATENT DOCUMENTS

| | | | |
|---|---|---|---|
| 2008/0136770 | A1 | 6/2008 | Peker et al. |
| 2008/0143187 | A1 | 6/2008 | Hoekstra et al. |
| 2008/0151082 | A1 | 6/2008 | Chan |
| 2008/0163291 | A1 | 7/2008 | Fishman et al. |
| 2008/0165203 | A1 | 7/2008 | Pantfoerder |
| 2008/0170031 | A1 | 7/2008 | Kuo |
| 2008/0176345 | A1 | 7/2008 | Yu et al. |
| 2008/0185976 | A1 | 8/2008 | Dickey et al. |
| 2008/0204375 | A1 | 8/2008 | Shin et al. |
| 2008/0218501 | A1 | 9/2008 | Diamond |
| 2008/0224892 | A1 | 9/2008 | Bogolea et al. |
| 2008/0230497 | A1 | 9/2008 | Strickland et al. |
| 2008/0246871 | A1 | 10/2008 | Kupper et al. |
| 2008/0259198 | A1 | 10/2008 | Chen et al. |
| 2008/0266554 | A1 | 10/2008 | Sekine et al. |
| 2008/0267328 | A1 | 10/2008 | Ianni et al. |
| 2008/0278099 | A1 | 11/2008 | Bergfors et al. |
| 2008/0278100 | A1 | 11/2008 | Hwang |
| 2008/0281165 | A1 | 11/2008 | Rai et al. |
| 2008/0303918 | A1 | 12/2008 | Keithley |
| 2008/0313691 | A1 | 12/2008 | Cholas et al. |
| 2009/0009997 | A1 | 1/2009 | Sanfilippo et al. |
| 2009/0014548 | A1 | 1/2009 | Criss et al. |
| 2009/0015400 | A1 | 1/2009 | Breed |
| 2009/0033612 | A1 | 2/2009 | Roberts et al. |
| 2009/0034283 | A1 | 2/2009 | Albright et al. |
| 2009/0036190 | A1 | 2/2009 | Brosnan et al. |
| 2009/0079416 | A1 | 3/2009 | Vinden et al. |
| 2009/0085859 | A1 | 4/2009 | Song |
| 2009/0091634 | A1 | 4/2009 | Kennedy et al. |
| 2009/0104989 | A1 | 4/2009 | Williams et al. |
| 2009/0109129 | A1 | 4/2009 | Cheong et al. |
| 2009/0129556 | A1 | 5/2009 | Ahn |
| 2009/0135167 | A1 | 5/2009 | Sakai et al. |
| 2009/0152445 | A1 | 6/2009 | Gardner, Jr. |
| 2009/0164615 | A1 | 6/2009 | Akkanen |
| 2009/0273568 | A1 | 11/2009 | Milner |
| 2009/0278766 | A1 | 11/2009 | Sako et al. |
| 2009/0284457 | A1 | 11/2009 | Botzas et al. |
| 2009/0289968 | A1 | 11/2009 | Yoshida |
| 2009/0315867 | A1 | 12/2009 | Sakamoto et al. |
| 2010/0017526 | A1 | 1/2010 | Jagannath et al. |
| 2010/0033413 | A1 | 2/2010 | Song et al. |
| 2010/0037274 | A1 | 2/2010 | Meuninck et al. |
| 2010/0039366 | A1 | 2/2010 | Hardy |
| 2010/0039414 | A1 | 2/2010 | Bell |
| 2010/0039440 | A1 | 2/2010 | Tanaka et al. |
| 2010/0060550 | A1 | 3/2010 | McGinn et al. |
| 2010/0060861 | A1 | 3/2010 | Medin |
| 2010/0066484 | A1 | 3/2010 | Hanwright et al. |
| 2010/0083305 | A1 | 4/2010 | Acharya et al. |
| 2010/0149567 | A1 | 6/2010 | Kanazawa et al. |
| 2010/0177157 | A1 | 7/2010 | Stephens et al. |
| 2010/0177158 | A1 | 7/2010 | Walter |
| 2010/0177750 | A1 | 7/2010 | Essinger et al. |
| 2010/0194725 | A1 | 8/2010 | Yoshida et al. |
| 2010/0198983 | A1 | 8/2010 | Monroe et al. |
| 2010/0226091 | A1 | 9/2010 | Dunn |
| 2010/0231563 | A1 | 9/2010 | Dunn et al. |
| 2010/0231602 | A1 | 9/2010 | Huang |
| 2010/0237697 | A1 | 9/2010 | Dunn et al. |
| 2010/0253660 | A1 | 10/2010 | Hashimoto |
| 2010/0299556 | A1 | 11/2010 | Taylor et al. |
| 2010/0309361 | A1 | 12/2010 | Fukushima |
| 2011/0016006 | A1 | 1/2011 | Opdycke |
| 2011/0019636 | A1 | 1/2011 | Fukuoka et al. |
| 2011/0032489 | A1 | 2/2011 | Kimoto et al. |
| 2011/0047567 | A1 | 2/2011 | Zigmond et al. |
| 2011/0050738 | A1 | 3/2011 | Fujioka et al. |
| 2011/0058326 | A1 | 3/2011 | Idems et al. |
| 2011/0074737 | A1 | 3/2011 | Hsieh et al. |
| 2011/0074803 | A1 | 3/2011 | Kerofsky |
| 2011/0078536 | A1 | 3/2011 | Han et al. |
| 2011/0102630 | A1 | 5/2011 | Rukes |
| 2011/0148904 | A1 | 6/2011 | Kotani |
| 2011/0163691 | A1 | 7/2011 | Dunn |
| 2011/0175872 | A1 | 7/2011 | Chuang et al. |
| 2011/0193872 | A1 | 8/2011 | Biernath et al. |
| 2011/0231676 | A1 | 9/2011 | Atkins et al. |
| 2011/0260534 | A1 | 10/2011 | Rozman et al. |
| 2011/0264273 | A1 | 10/2011 | Grabinger et al. |
| 2011/0279426 | A1 | 11/2011 | Imamura et al. |
| 2011/0283199 | A1 | 11/2011 | Schuch et al. |
| 2012/0075362 | A1 | 3/2012 | Ichioka et al. |
| 2012/0081279 | A1 | 4/2012 | Greenebaum et al. |
| 2012/0105424 | A1 | 5/2012 | Lee et al. |
| 2012/0162204 | A1 | 6/2012 | Vesely et al. |
| 2012/0176420 | A1 | 7/2012 | Liu |
| 2012/0182278 | A1 | 7/2012 | Ballestad |
| 2012/0197459 | A1 | 8/2012 | Fukano |
| 2012/0203872 | A1 | 8/2012 | Luby et al. |
| 2012/0211001 | A1 | 8/2012 | Elshafei |
| 2012/0212520 | A1 | 8/2012 | Matsui et al. |
| 2012/0252495 | A1 | 10/2012 | Moeglein et al. |
| 2012/0268436 | A1 | 10/2012 | Chang |
| 2012/0269382 | A1 | 10/2012 | Kiyohara et al. |
| 2012/0284547 | A1 | 11/2012 | Culbert et al. |
| 2012/0302343 | A1 | 11/2012 | Hurst et al. |
| 2012/0308191 | A1 | 12/2012 | Chung et al. |
| 2013/0007110 | A1 | 1/2013 | Centner |
| 2013/0027370 | A1 | 1/2013 | Dunn et al. |
| 2013/0070567 | A1 | 3/2013 | Marzouq |
| 2013/0098425 | A1 | 4/2013 | Amin et al. |
| 2013/0113973 | A1 | 5/2013 | Miao |
| 2013/0158730 | A1 | 6/2013 | Yasuda et al. |
| 2013/0162908 | A1 | 6/2013 | Son et al. |
| 2013/0173358 | A1 | 7/2013 | Pinkus |
| 2013/0278868 | A1 | 10/2013 | Dunn et al. |
| 2013/0279090 | A1 | 10/2013 | Brandt |
| 2013/0282154 | A1 | 10/2013 | Chappell et al. |
| 2013/0344794 | A1 | 12/2013 | Shaw et al. |
| 2014/0002747 | A1 | 1/2014 | Macholz |
| 2014/0009893 | A1 | 1/2014 | Lai |
| 2014/0132796 | A1 | 5/2014 | Prentice et al. |
| 2014/0139116 | A1 | 5/2014 | Reed |
| 2014/0172174 | A1 | 6/2014 | Poss et al. |
| 2014/0184980 | A1 | 7/2014 | Onoue |
| 2014/0190240 | A1 | 7/2014 | He et al. |
| 2014/0204452 | A1 | 7/2014 | Branson |
| 2014/0230526 | A1 | 8/2014 | Willemin et al. |
| 2014/0232709 | A1 | 8/2014 | Dunn et al. |
| 2014/0293605 | A1 | 10/2014 | Chemel et al. |
| 2014/0365965 | A1 | 12/2014 | Bray et al. |
| 2015/0009627 | A1 | 1/2015 | Dunn et al. |
| 2015/0062892 | A1 | 3/2015 | Krames et al. |
| 2015/0070337 | A1 | 3/2015 | Bell et al. |
| 2015/0169827 | A1 | 6/2015 | LaBorde |
| 2015/0193074 | A1 | 7/2015 | Cudak et al. |
| 2015/0237761 | A1 | 8/2015 | Dunn |
| 2015/0250021 | A1 | 9/2015 | Stice et al. |
| 2015/0310313 | A1 | 10/2015 | Murayama et al. |
| 2015/0319882 | A1 | 11/2015 | Dunn et al. |
| 2015/0346525 | A1 | 12/2015 | Wolf et al. |
| 2015/0348460 | A1 | 12/2015 | Cox et al. |
| 2016/0034240 | A1 | 2/2016 | Kreiner et al. |
| 2016/0037606 | A1 | 2/2016 | Dunn et al. |
| 2016/0055671 | A1 | 2/2016 | Menozzi et al. |
| 2016/0112521 | A1 | 4/2016 | Lawson et al. |
| 2016/0125468 | A1 | 5/2016 | Staneluis et al. |
| 2016/0125772 | A1 | 5/2016 | Li et al. |
| 2016/0162297 | A1 | 6/2016 | Shao |
| 2016/0292744 | A1 | 10/2016 | Strimaitis et al. |
| 2016/0293142 | A1 | 10/2016 | Bowden et al. |
| 2016/0334811 | A1 | 11/2016 | Marten |
| 2016/0335698 | A1 | 11/2016 | Jones et al. |
| 2016/0338182 | A1 | 11/2016 | Schuch et al. |
| 2016/0358530 | A1 | 12/2016 | Schuch et al. |
| 2016/0358538 | A1 | 12/2016 | Schuch et al. |
| 2016/0360167 | A1 | 12/2016 | Mitchell et al. |
| 2017/0060369 | A1 | 3/2017 | Goyal et al. |
| 2017/0075777 | A1 | 3/2017 | Dunn et al. |
| 2017/0083043 | A1 | 3/2017 | Bowers et al. |
| 2017/0091822 | A1 | 3/2017 | Tian et al. |
| 2017/0111486 | A1 | 4/2017 | Bowers et al. |

(56) References Cited

U.S. PATENT DOCUMENTS

| | | | |
|---|---|---|---|
| 2017/0111520 | A1 | 4/2017 | Bowers et al. |
| 2017/0163519 | A1 | 6/2017 | Bowers et al. |
| 2017/0168295 | A1 | 6/2017 | Iwami |
| 2017/0242502 | A1 | 8/2017 | Gray et al. |
| 2017/0242534 | A1 | 8/2017 | Gray |
| 2017/0256051 | A1 | 9/2017 | Dwivedi et al. |
| 2017/0315886 | A1 | 11/2017 | Helmick et al. |
| 2018/0012565 | A1 | 1/2018 | Dunn |
| 2018/0027635 | A1 | 1/2018 | Roquemore, III |
| 2018/0042134 | A1 | 2/2018 | Dunn et al. |
| 2018/0088368 | A1 | 3/2018 | Notoshi et al. |
| 2018/0089717 | A1 | 3/2018 | Morin et al. |
| 2018/0128708 | A1 | 5/2018 | Cirino |
| 2018/0129461 | A1 | 5/2018 | Kim-Whitty |
| 2018/0130385 | A1 | 5/2018 | Qian et al. |
| 2018/0181091 | A1 | 6/2018 | Funk et al. |
| 2018/0203475 | A1 | 7/2018 | Van Derven et al. |
| 2018/0268783 | A1 | 9/2018 | Woo |
| 2018/0284758 | A1 | 10/2018 | Cella et al. |
| 2018/0314103 | A1 | 11/2018 | Dunn et al. |
| 2019/0018506 | A1 | 1/2019 | Bernstein et al. |
| 2019/0021189 | A1 | 1/2019 | Kim et al. |
| 2019/0087042 | A1 | 3/2019 | Van Ostrand et al. |
| 2019/0096202 | A1 | 3/2019 | Seelman |
| 2019/0116719 | A1 | 4/2019 | Fletcher et al. |
| 2019/0171331 | A1 | 6/2019 | Gray et al. |
| 2019/0289754 | A1 | 9/2019 | Hubbard |
| 2019/0339312 | A1 | 11/2019 | Dunn et al. |
| 2019/0367148 | A1 | 12/2019 | Kehlenbeck et al. |
| 2019/0383778 | A1 | 12/2019 | Dunn et al. |
| 2020/0012116 | A1 | 1/2020 | Fuerst et al. |
| 2020/0012383 | A1 | 1/2020 | Wang et al. |
| 2020/0019363 | A1 | 1/2020 | Newnham et al. |
| 2020/0033017 | A1 | 1/2020 | Brown et al. |
| 2020/0128701 | A1 | 4/2020 | Whitehead et al. |
| 2020/0272269 | A1 | 8/2020 | Dunn |
| 2020/0294401 | A1 | 9/2020 | Kerecsen |
| 2020/0390009 | A1 | 12/2020 | Whitehead et al. |
| 2021/0034101 | A1 | 2/2021 | Yildiz et al. |
| 2021/0035494 | A1 | 2/2021 | Yildiz et al. |
| 2021/0174715 | A1 | 6/2021 | Holloway et al. |
| 2021/0302779 | A1 | 9/2021 | Dunn |
| 2021/0397292 | A1 | 12/2021 | Dunn |
| 2022/0121255 | A1 | 4/2022 | Wang et al. |
| 2022/0260872 | A1 | 8/2022 | Dunn et al. |
| 2022/0295666 | A1 | 9/2022 | Dunn et al. |
| 2023/0029615 | A1 | 2/2023 | Dunn et al. |
| 2023/0048815 | A1 | 2/2023 | Newnham et al. |
| 2023/0052966 | A1 | 2/2023 | Newnham et al. |
| 2023/0160774 | A1 | 5/2023 | Dunn et al. |
| 2023/0296278 | A1 | 9/2023 | Sawada et al. |
| 2023/0333423 | A1 | 10/2023 | Dunn et al. |
| 2024/0144806 | A1 | 5/2024 | Dunn |
| 2024/0201040 | A1 | 6/2024 | Dunn et al. |

FOREIGN PATENT DOCUMENTS

| | | | |
|---|---|---|---|
| CN | 217384567 | U | 9/2022 |
| EP | 0313331 | B1 | 2/1994 |
| EP | 1686777 | A1 | 8/2006 |
| EP | 1821538 | A1 | 8/2007 |
| EP | 2299723 | A1 | 3/2011 |
| EP | 2351369 | A2 | 8/2011 |
| GB | 2369730 | A | 5/2002 |
| JP | 61-234690 | A | 10/1986 |
| JP | 61-251901 | A | 11/1986 |
| JP | 3-153212 | A | 7/1991 |
| JP | 5-18767 | A | 1/1993 |
| JP | 7-74224 | A | 3/1995 |
| JP | 8193727 | A | 7/1996 |
| JP | 8-338981 | A | 12/1996 |
| JP | 11-160727 | A | 6/1999 |
| JP | 2000122575 | A | 4/2000 |
| JP | 3080628 | B2 | 8/2000 |
| JP | 2002064842 | A | 2/2002 |
| JP | 2002209230 | A | 7/2002 |
| JP | 2005-148490 | A | 6/2005 |
| JP | 2005-211449 | A | 8/2005 |
| JP | 2005-211451 | A | 8/2005 |
| JP | 2005236469 | A | 9/2005 |
| JP | 2005265922 | A | 9/2005 |
| JP | 2005-338266 | A | 12/2005 |
| JP | 2005333568 | A | 12/2005 |
| JP | 2006-106345 | A | 4/2006 |
| JP | 2006-145890 | A | 6/2006 |
| JP | 2006318733 | A | 11/2006 |
| JP | 2007003638 | A | 1/2007 |
| JP | 2007322718 | A | 12/2007 |
| JP | 2008-34841 | A | 2/2008 |
| JP | 2008122695 | A | 5/2008 |
| JP | 2009031622 | A | 2/2009 |
| JP | 2010282109 | A | 12/2010 |
| JP | 2014-149485 | A | 8/2014 |
| KR | 200361111 | Y1 | 9/2004 |
| KR | 10-2006-0016469 | A | 2/2006 |
| KR | 10-0768584 | B1 | 10/2007 |
| KR | 10-2008-0013592 | A | 2/2008 |
| KR | 10-2008-0086245 | A | 9/2008 |
| KR | 10-2009-0014903 | A | 2/2009 |
| KR | 10-2010-0081354 | A | 7/2010 |
| KR | 10-2011-0065338 | | 6/2011 |
| KR | 10-2014-0054747 | A | 5/2014 |
| WO | WO9608892 | A1 | 3/1996 |
| WO | WO2008050402 | A1 | 5/2008 |
| WO | 2010/141739 | A2 | 12/2010 |
| WO | 2011/052331 | A1 | 5/2011 |
| WO | WO2012/127971 | A1 | 9/2012 |
| WO | WO2013/182733 | A1 | 12/2013 |
| WO | 2016/183576 | A1 | 11/2016 |
| WO | 2017/031237 | A1 | 2/2017 |
| WO | 2017/210317 | A1 | 12/2017 |
| WO | 2020/081687 | A1 | 4/2020 |
| WO | WO2023/009477 | A1 | 2/2023 |

OTHER PUBLICATIONS

Vogler, A. et al., Photochemistry and Beer, Journal of Chemical Education, Jan. 1982, pp. 25-27, vol. 59, No. 1.

Zeeff, T.M. et al., Abstract of EMC analysis of 18" LCD Monitor, Electromagnetic Compatibility, IEEE International Symposium, Aug. 21-25, 2000, vol. 1, 1 page.

Lee, X., What is Gamma Correction in Images and Videos?, http://xahlee.info/img/what_is_gamma_correction.html, Feb. 24, 2010, 4 pages.

Hoober, S. et al., Designing Mobile Interfaces, 2012, pp. 519-521, O'Reilly Media.

Rouaissia, C., Adding Proximity Detection to a Standard Analog-Resistive Touchscreen, SID 2012 Digest, 2012, 1564-1566, p. 132.

Photo Research, Inc., PR®-650 SpectraScan® Colorimeter, 1999, 2 pages.

Texas Advanced Optoelectronic Solutions Inc., TCS230 Programmable Color Light-To-Frequency Converter, Dec. 2007, 12 pages.

Methven, Don, Wireless Video Streaming: An Overview, Nov. 16, 2022, 7 pages.

Outdoorlink, Inc., SmartLink One, One Relay, http://smartlinkcontrol.com/billboard/one-relay/, retrieved Apr. 17, 2019, 2007-16, 6 pages.

Outdoorlink, Inc., SmartLink Website User Manual, http://smartlink.outdoorlinkinc.com/docs/SmartLinkWebsiteUserManual.pdf, 2017, 33 pages.

Outdoorlink, Inc., SmartLink One Out of Home Media Controller, 2016, 1 page.

Sigmasense, Analog can't touch Digital, https://sigmasense.com/, retrieved Jan. 23, 2019, 5 pages.

Sigmasense, Solutions, https://sigmasense.com/solutions/, retrieved Jan. 23, 2019, 4 pages.

Sigmasense, Technology, https://sigmasense.com/technology/, retrieved Jan. 23, 2019, 3 pages.

(56) References Cited

OTHER PUBLICATIONS

Turley, Jim, SigmaSence ICCI Goes Big, New Touch Technology Aimed at Big Screens, But That's Just for Starters, EEJournal, https://www.eejournal.com/article/sigmasense-icci-goes-big/, Jan. 8, 2019, 3 pages.

DISPLAY UNITS WITH AUTOMATED POWER GOVERNING

CROSS-REFERENCE TO RELATED APPLICATIONS

This application is a continuation of U.S. application Ser. No. 18/885,160 filed Sep. 13, 2024, which is a continuation of U.S. application Ser. No. 18/652,287 filed May 1, 2024, now U.S. Pat. No. 12,118,953 issued Oct. 15, 2024, which is a continuation of U.S. application Ser. No. 18/214,948 filed Jun. 27, 2023, now U.S. Pat. No. 12,027,132 issued Jul. 2, 2024, the disclosures of which are hereby incorporated by reference as if fully restated herein.

TECHNICAL FIELD

Exemplary embodiments relate generally to display units with automated power governing as well as systems and methods related to the same.

BACKGROUND AND SUMMARY OF THE INVENTION

Digital out of home advertising has grown in recent years, and continues to be a major source of interest, not only for advertising, but also for other public announcements, various marketing and other services, "smart city" services, telecommunication services, and the like. These units are exposed to a wide variety of operating conditions (e.g., weather, user, and/or environment based) and demands (e.g., usage and/or programmed operational parameters). It is known to provide electronic displays in ruggedized enclosures, such as with thermal management and/or remote monitoring and/or control functions, to provide survivability and adaptability of such units under such demanding conditions. For example, it is known to limit alternating current (AC) draw on various electronic devices. It is also known to limit direct current (DC) draw on various electronic devices. It is also known to set thermal limits on various electronic devices where conditions are changed in response to meeting the thermal limit. However, current solutions fail to gracefully control such units in a fashion which exerts sufficient automated control to prevent or limit disruptions to user experiences while also safeguarding units from failure. What is needed is a power governing control system which reliably and operably controls such units to reduce or prevent failure while also minimizing disruption to user experience.

Units with power governing control systems which reliably control such units to reduce or prevent failure while also minimizing disruption to user experience are provided, along with systems and methods related to the same. Units may include one or more electronic displays. The units may include a control system with one or more of: an AC governor, a DC governor, and a thermal governor. The control system may be electrically interposed between a power source (e.g., external utility power supply) for the unit and some or all electricity consuming components of the unit (e.g., electronic displays, thermal management systems, customer equipment, peripheral equipment, combinations thereof, or the like). The governors may operably control illumination sources for the electronic displays, such as the backlights.

For the AC governor, where an AC current threshold is met or exceeded, the AC governor may operate in an AC current mitigation mode, such as by reducing power supplied to the illumination sources and/or other electricity consuming components rapidly, such as in a matter of seconds, and/or less than one second. The AC current threshold may be set relative to service rated current, such as between 70%-99% of the service rating. Power levels may be automatically increased where the AC current threshold is no longer met.

One or more circuit breakers or the like may be electrically interposed between the power source for the unit and some or all electricity consuming components of the unit to serve as a backup in case of continued AC current increase. The AC current threshold may be set to below the circuit breaker ratings, such as at 70%-99% thereof. AC current input may be monitored by the control system and electronic notifications may be generated and/or transmitted to remote device(s) where the AC current input is below a predetermined threshold, such as an expected current input or a margin thereof.

For the DC governor, where a DC current demand threshold is met or exceeded, the DC governor may operate in a DC current mitigation mode such as by reducing, at a relatively moderate rate, such as in a matter of multiple seconds or minutes, power to the illumination sources and/or other electricity consuming components, such as down to a zero level. Power levels may be automatically increased where the DC current threshold is no longer met.

Where one or more service limits of DC power supplies are met or exceeded, which may be a threshold above the DC current demand threshold, the DC power supplies may be automatically shut off and begin a restart sequence.

For the thermal governor, where the thermal management system of a unit is at maximum capacity or some other threshold capacity (e.g., 70-99% thereof), and any one or more internal temperatures, such as measuring by one or more temperature sensors in electronic communication with the control system, the thermal governor may operate in a thermal mitigation mode, such as by reducing to relatively slow, such as over a matter of several minutes, reduce power provided to the illumination sources, such as down to a zero level. Power levels may be automatically increased where the DC current threshold is no longer met, such as over a period of a same or different number of minutes.

The power adjustments shown and/or described herein, such as by the AC, DC, and/or thermal governors may be provided on various bases, such as but not limited to, on a linear, exponential and/or the like basis relative to the respective threshold(s). A grace value may be set such that the governors are configured to remain within the various mitigation modes unless/until the relevant values pass the respective thresholds by at least a predetermined amount. This may reduce or prevent rapid and frequent transitions between the normal mode and mitigation mode(s).

The governors may be operated independently and may independently provide benefits for reducing or eliminating failures and interruptions to user experiences. Analysis of measures against thresholds for each governor may be performed in parallel or in any sequence. The combination and operation of the governors, in particular, may provide exceptional reduction or elimination of failures and interruptions to user experiences. The integrated safety feature may alternatively, or additionally, permit the reduction in power supplies for a unit and/or reduce power consumption for a unit, among other benefits. This may allow provided power supplies to operate closer to capacity, whereby increased efficiencies are generally found. A centralized control system may prioritize received requests from the governor(s) for operational changes, such as but not limited to, by prioritizing the largest reductions to illumination levels.

Further features and advantages of the systems and methods disclosed herein, as well as the structure and operation of various aspects of the present disclosure, are described in detail below with reference to the accompanying figures.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF EXEMPLARY EMBODIMENT(S)

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Embodiments of the invention are described herein with reference to illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Figure 1:
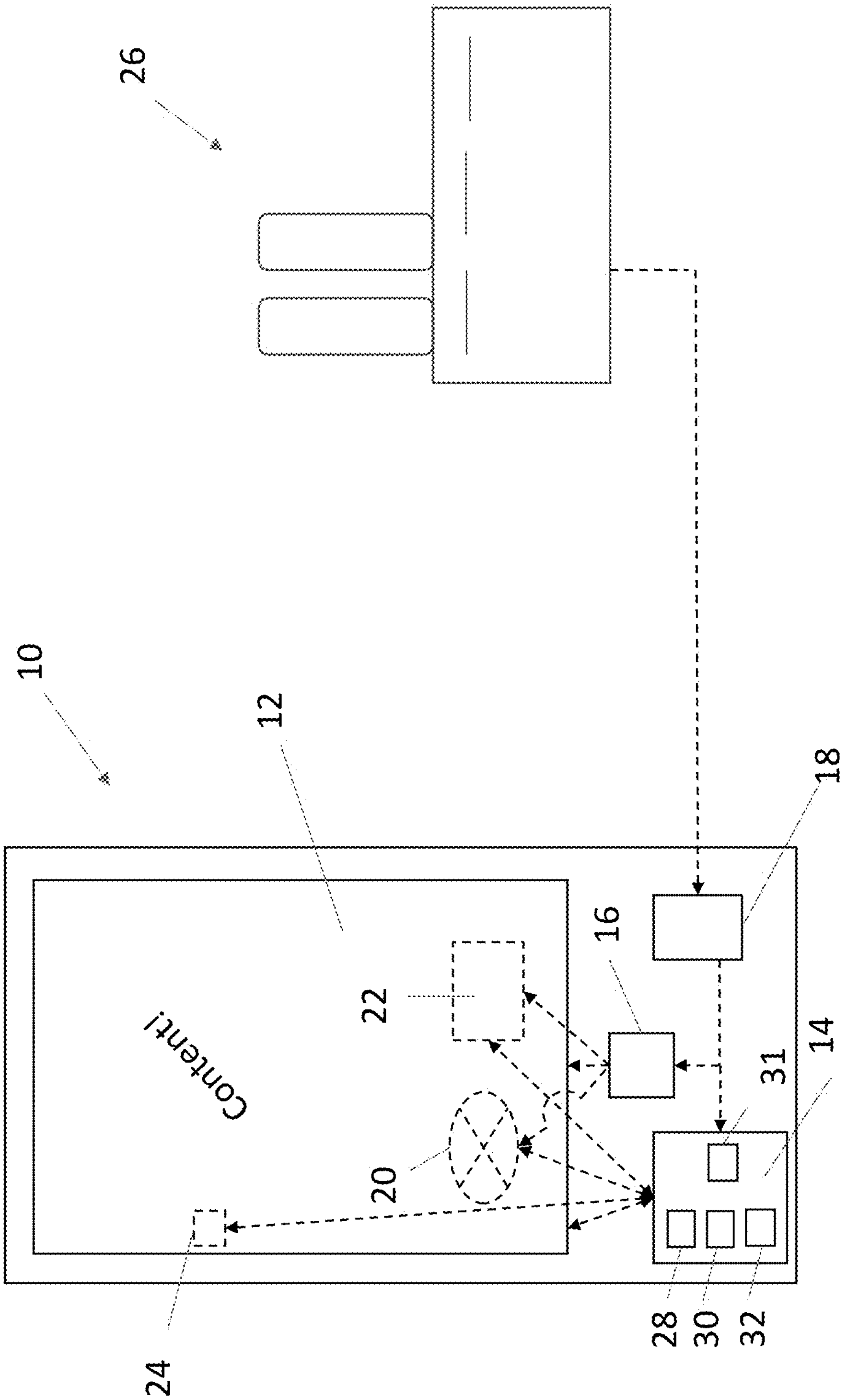
FIG. 1 is a simplified plan view of an exemplary unit with automated power governing features and related system components.

FIG. 1 illustrates an exemplary outdoor display unit 10 (hereinafter "unit" for brevity). The unit 10 may include one or more electronic displays 12 (hereinafter also "display" for brevity). Each electronic display 12 may include liquid crystal displays (LCDs), organic light emitting diode displays (OLED), light emitting diode (LED) displays, plasma displays, cathode ray tube displays, rear projection displays, combinations thereof, or the like. Each electronic display 12 may include one or more backlights, such as direct backlights, edge lighting, combinations thereof, or the like. Each display 12 may not require a separate backlight, such as in the case of OLEDs, which are self-illuminating.

The units 10 may include one or more thermal management systems 20. The thermal management systems 20 may comprise one or more fans, open loop airflow pathways, closed loop airflow pathways, thermoelectric modules, air conditioning units, sensors 24, combinations thereof, or the like. The thermal management systems 20 may be, for example, without limitation, as shown and/or described in one or more of: U.S. Pat. No. 9,629,287 granted Apr. 18, 2017 entitled SYSTEM FOR USING CONSTRICTED CONVECTION WITH CLOSED LOOP COOLING SYSTEM AS THE CONVECTION PLATE, U.S. Pat. No. 10,506,738 granted Dec. 10, 2019 entitled CONSTRICTED CONVECTION COOLING FOR AN ELECTRONIC DISPLAY, U.S. Pat. No. 11,540,418granted Dec. 27, 2022 entitled ELECTRONIC DISPLAY WITH COOLING, and/or U.S. Pat. No. 11,032,923 granted Jun. 8, 2021 entitled FIELD SERVICEABLE DISPLAY ASSEMBLY, the disclosures of each of the foregoing being hereby incorporated by reference as if fully restated herein. Other types and/or kinds of thermal management systems 20 may be utilized.

The units 10 may include one or more additional electricity consuming components 22, such as but not limited to, radio transmitters/receivers (e.g., "5G" wireless equipment), cameras, touchscreens, sensors, servers, sensors 24, combinations thereof, or the like.

The units 10 may comprise one or more sensors 24. The sensors 24 may comprise temperature sensors, pressure sensors, air quality sensors, air flow sensors, location detection devices, light sensors, color sensors, combinations thereof, or the like. Any number and/or type of sensors 24 may be provided at any number of locations within the units 10.

The control subsystem 14 may be configured to adjust electronic display 12 illumination (e.g., backlight, OLED) based on sensed ambient lighting conditions, such as by way of the one or more sensors 24. In exemplary embodiments, without limitation, the control subsystem 14 may be configured to normally increase the power level of the electronic displays 12 under relatively high ambient light conditions to provide increased image visibility. In exemplary embodiments, without limitation, the control subsystem 14 may be configured to normally decrease the power level of the electronic displays 12 under relatively low ambient light conditions to save power. Such components and/or operations may be, for example, without limitation, as shown and/or described in U.S. Pat. No. 10,440,790 granted Oct. 8, 2019 entitled ELECTRONIC DISPLAY SYSTEM WITH ILLUMINATION CONTROL, the disclosures of which are hereby incorporated by reference as if fully restated herein. Other components and/or methods of control may be utilized.

The electronic displays 12, thermal management systems 20, additional electricity consuming components 22, sensors 24, combinations thereof, or the like may be in electronic communication with a control subsystem 14, which may receive data therefrom and/or provide operational commands to such components.

The control subsystem 14 may, additionally or alternatively, be in electronic communication with a power subsystem 16. The power subsystem 16 may comprise one or more power supplies (e.g., DC power supplies), power transformers, power regulation components, capacitors, bulk energy storage devices (e.g., batteries), power converters (e.g., AC/DC converters), switches, combinations thereof, or the like. The power subsystem 16 may be electrically interposed between some or all electricity consuming components of the unit 10 (e.g., electronic displays 12, thermal management systems 20, additional electricity consuming components 22, sensors 24, combinations thereof, or the like) and a power source 26 (e.g., external utility power supply).

Alternatively, or additionally, the control subsystem 14 may be electrically interposed between some or all electricity consuming components of the unit 10 (e.g., electronic displays 12, thermal management systems 20, additional electricity consuming components 22, sensors 24, combinations thereof, or the like) and the power source 26. The power source 26 may comprise one or more external utility power supplies, such as power generation facilities (e.g., power plants), utility lines, and/or power grids, bulk energy storage devices (e.g., batteries), local power supplies (e.g., wind power, portable or fixed power generators, solar power, combinations thereof, or the like), combinations thereof, or the like. One or more power sources 26 may be available (e.g., solar power with backup utility power). The power sources 26 may be external to the units 10. In at least the case of solar power and/or bulk energy storage devices, some or all of the power sources 26, or components thereof, may be, in whole or in part, internal to the unit 10.

Alternatively, or additionally, a power overload prevention subsystem 18 may be electrically interposed between some or all electricity consuming components of the unit 10 (e.g., electronic displays 12, thermal management systems 20, additional electricity consuming components 22, sensors 24, combinations thereof, or the like) and the power source 26. The power overload prevention subsystem 18 may comprise one or more circuit breakers, fuses, combinations thereof, or the like.

The control subsystem 14 may comprise, or be in electronic communication with (such as, by way of non-limiting example, provided at the power subsystem 16 or otherwise) one or more of: an AC power governor 28, DC power governor 30, and thermal governor 32 (collectively the "governors" for brevity). One or more of the governors may be independent components, part of the control subsystem 14, part of the power subsystem 16, combinations thereof, or the like. One or more of the governors may comprise hardware components, such as but not limited to, processors, electronic storage devices, computing devices, switches, power transformers, power limiters, power regulators, combinations thereof, or the like, and/or software components, such as but not limited to, software code, variables, algorithms, operational command subroutines, combinations thereof, or the like.

The control subsystem 14, power subsystem 16, and one or more of the governors may comprise one or more power meters and/or simulated power meters, such as shown and/or described in one or more of, and/or use one or more of the techniques shown and/or described in: U.S. Pat. No. 11,022,635 granted Jun. 1, 2021 entitled MEASURING POWER CONSUMPTION OF AN ELECTRONIC DISPLAY ASSEMBLY. Such power meters and/or simulated power meters and/or related techniques may serve as sensor(s) 24, though such is not required.

The control subsystem 14 may comprise, or be in electronic communication with, one or more network communication devices, such as for wired and/or wireless transmission and/or receipt of data. Such data may include data regarding unit 10 operation, commands, protocols, software, and/or thresholds, combinations thereof, or the like. The network communication devices may be configured to facilitate electronic communication by way of one or more internets, intranets, cellular networks, combinations thereof, or the like.

The units 10 may comprise one or more internal support frameworks, external housings, cover panels, ventilation systems, filters, openings, combinations thereof, or the like, and may be provided in a variety of sizes, shapes, and/or configurations. Some or all of the components of the units 10 shown and/or described may be internal to the units 10 and/or external thereto.

Figure 2:
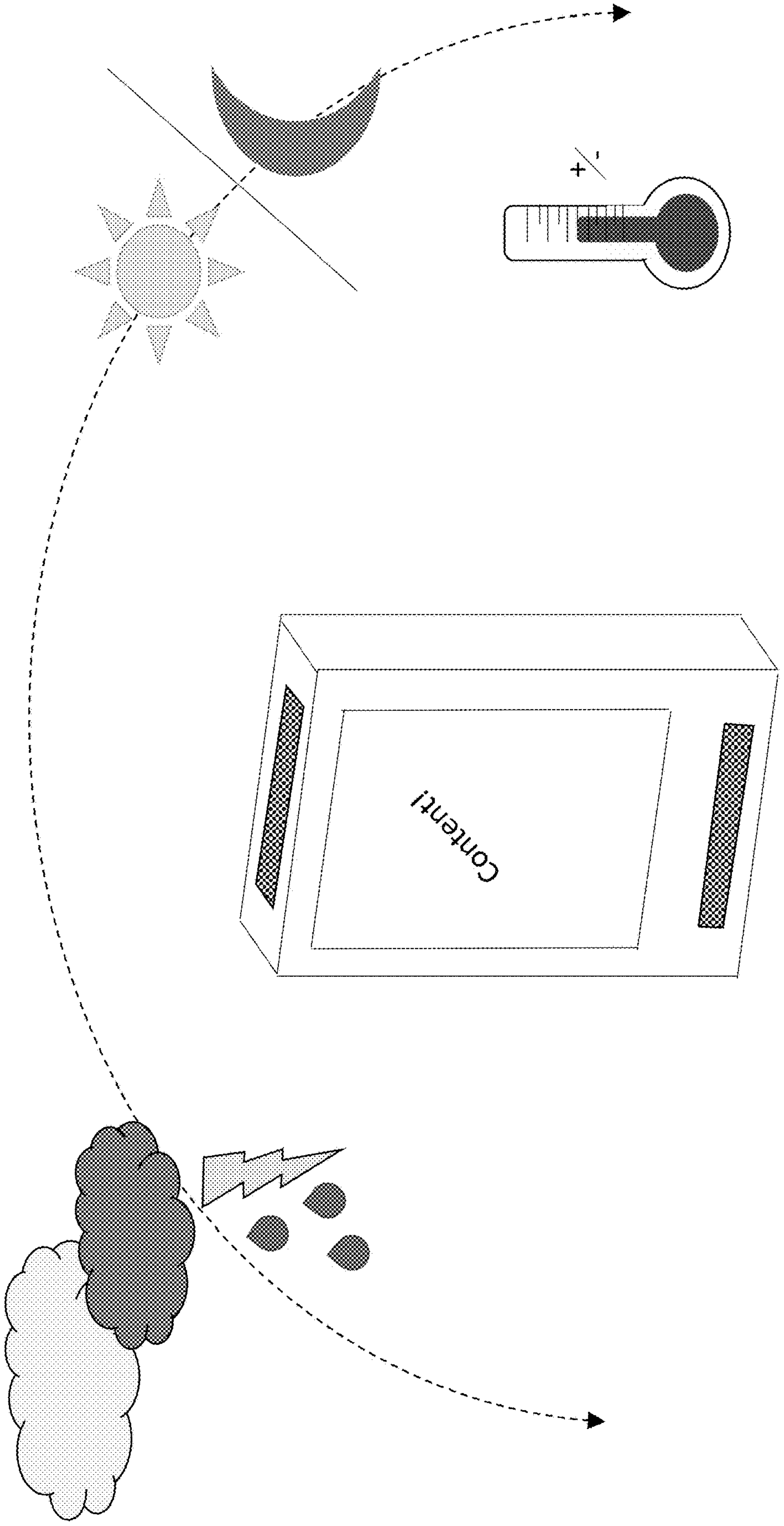
FIG. 2 is a simplified perspective view of the unit of FIG. 1 in an exemplary environmental operation context.

As illustrated with particular regard to FIG. 2, a large variety of ambient weather and other operating conditions experienced by the units 10 may result in drastic fluctuations to unit 10 needs and/or operational characteristics, such as thermal management subsystem 20 demands, experienced temperatures (e.g., due to ambient temperatures, solar loading, solar angle, seasonal changes, weather patterns, combinations thereof, or the like), ambient lighting conditions (e.g., sun and moonlight movement, shade, cloud cover, precipitation, seasonal changes, combinations thereof, and the like) and resulting need to alter electronic display 12 illumination levels to render image sufficiently visible, combinations thereof, or the like. By way of non-limiting example, relatively warm temperatures and/or high solar loading may increase demand on the thermal management subsystem 20 for cooling and/or desire for increased illumination levels of the electronic displays 12 for image visibility, resulting in relatively high electrical demand on the unit 10 and/or high internal temperature levels, thereby pushing the unit 10 to the extremes of its operating abilities. Changing global weather patterns and extreme weather events may contribute to such extreme conditions. The automated power governing features shown and/or described herein may assist with managing the unit 10 such that the most extreme of such conditions, reducing the need to otherwise significantly engineer the units 10 for such unlikely or rare events. This may reduce design complexity and unit 10 cost while improving reliability and user experience. The illustrated and/or described examples of operating conditions are merely exemplary and not intended to be limiting.

Figure 3:
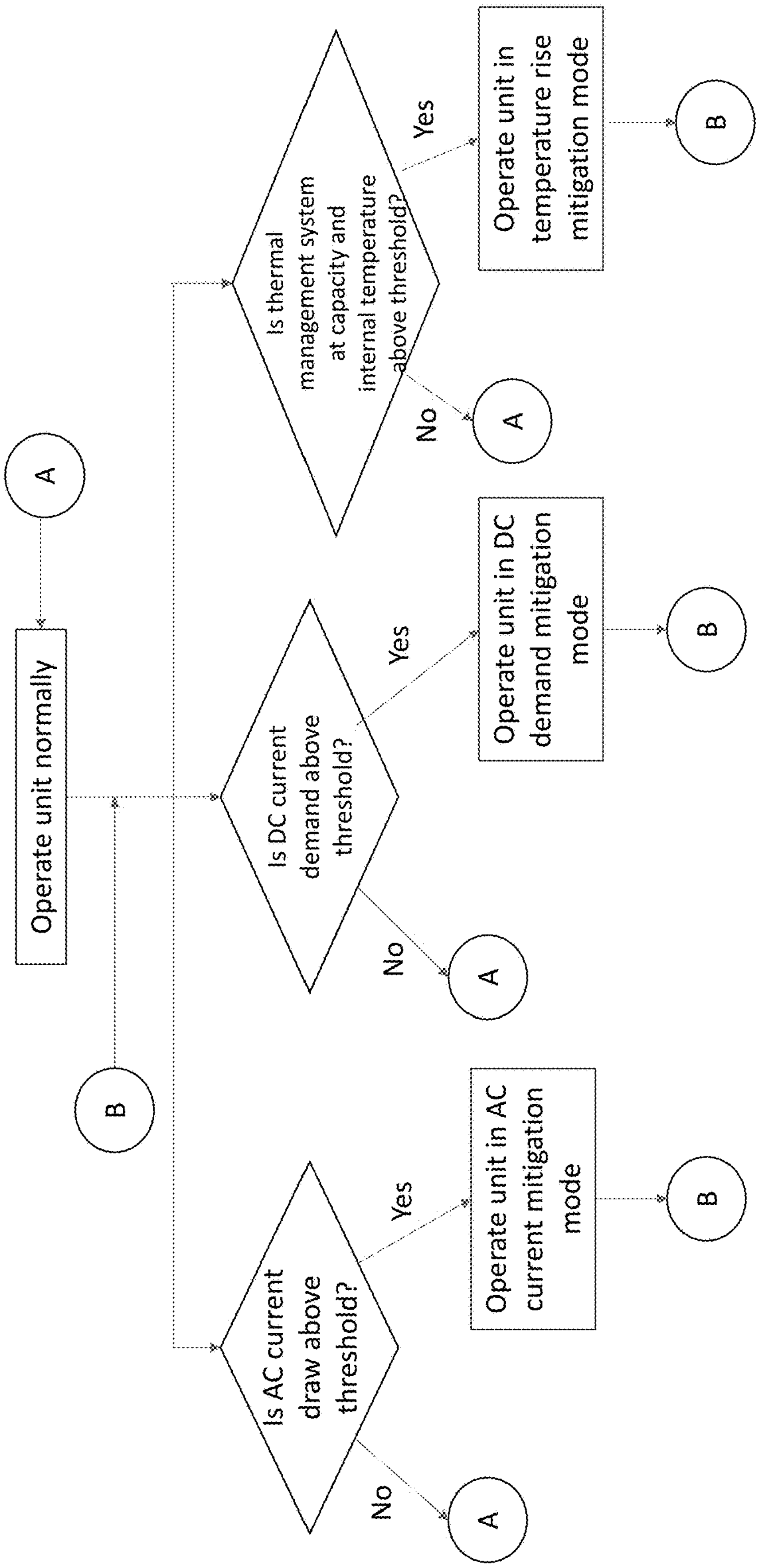
FIG. 3 is a flow chart with exemplary logic for operating the unit of FIG. 1, such as when operating in the various environmental operation conditions illustrated by FIG. 2.

FIG. 3 provides exemplary logic for operating the unit 10, such as during the various exemplary operating conditions of FIG. 2. The control subsystem 14 may operate the unit 10 normally. Such normal operations may include, for example, without limitation, displaying content at the electronic displays 12, adjusting illumination of the electronic displays 12, such as in response to ambient light readings taken by one or more of the sensors 24, operating the thermal management subsystem 20, such as by running fans at various speeds based on temperature readings taken by one or more of the sensors 24, operating customer or peripheral equipment, such as providing wayfinding information, telephonic, voice, and/or video calls, operating wireless "hotspots", receiving and/or processing information from the additional electronic equipment 22, such as cameras, combinations thereof, or the like. These are merely exemplary and not intended to be limiting.

While undertaking normal operations, the control subsystem 14 may monitor one or more operating conditions of the unit 10, such as by way of the sensors 24, thermal management subsystem 20, and/or power subsystem 16. In exemplary embodiments, without limitation, the AC governors 28 may periodically, continuously, randomly, combinations thereof, or the like, monitor AC current draw; the DC governor 30 may periodically, continuously, randomly, combinations thereof, or the like, monitor DC current draw; the thermal governor 32 may periodically, continuously, randomly, combinations thereof, or the like, monitor temperatures (e.g., by way of one or more sensors 24) and thermal management subsystem 20 operations, respectively. Each unit 10 may comprise one, some, or all of the governors 28, 30, 32 in a same or different combination.

Where the AC governor 28 determines that AC current draw is above a predetermined threshold, the AC governor 28 may initiate a current draw mitigation mode. The predetermined threshold may be between 70-99% of the service rated expected installed AC power, though any threshold may be utilized. The current draw mitigation mode may comprise initiating a subroutine which comprises issuing commands, such as by way of the control subsystem 14, to the electronic displays 12 to rapidly, such as in a matter of seconds or less than 1 second, begin reducing illumination levels of the electronic displays 12, such as by dimming the backlight. This may reduce or prevent nuisance tripping of circuit breakers, such as at the power overload prevention subsystem 18. In this way, the current draw mitigation mode may replace and/or override the normal operations. The unit 10 may remain in the current draw mitigation mode until AC current draw is below the predetermined threshold, such as by at least a margin to prevent continued movement between normal operation mode and current draw mitigation mode. Where the AC governor 28 determines that AC current draw is below the predetermined threshold, the AC governor 28 continue with normal operations.

The AC governor 28, control subsystem 14, and/or power subsystem 16 may monitor current supplied, such as on a continual, periodic, and/or random basis. Where the current draw is below an expected level, an electronic notification may be automatically generated and transmitted, such as by way of one or more network communication devices, to one or more remote electronic devices (e.g., computers, smart phones, tablets, servers, etc.). The network communication devices and transmission may be made by way of one or more internets, intranets, cellular networks, combinations thereof, or the like.

Expected power supply levels, including current supply levels, may vary based on unit 10 configuration, such as size, number, and/or type of the electronic displays 12 installed, anticipated driving levels for the electronic displays 12, other equipment 22 installed, expected ambient conditions, combinations thereof, and the like. Such power consumption levels may vary from approximately 200 watts to 5000+ watts, though any power level may be expected. Such expected current may vary from less than 2 amps to over 25 amps, though any current level may be expected. Circuit breakers may be configured to trip at less than 5 amps to over 30 amps, though any threshold may be utilized. These are provided by way of non-limiting example.

Actual power supplied may vary based on power source 26 type and/or operational fluctuations, economic issues (e.g., operator unable or unwilling to pay for certain power supply at peak times, by way of non-limiting example), combinations thereof, or the like.

Where the DC governor 30 determines that DC current demand is above a predetermined threshold, the DC governor 30 may initiate a power demand mitigation mode. The predetermined threshold may be reflective of limits of one or more installed power supplies, such as forming part of the power subsystem 16. The predetermined threshold may be between 80-100% of the limits of the one or more installed power supplies, though any amount may be utilized. The power demand mitigation mode may comprise initiating a subroutine which comprises issuing commands, such as by way of the control subsystem 14, to the electronic displays 12 to at a relatively moderate pace, such as in a matter of seconds (e.g., between 3-60 seconds) or minutes, begin reducing illumination levels of the electronic displays 12, such as by dimming the backlight. This may reduce or prevent the one or more power supplies from reaching their maximum limit and turning off. In this way, the power demand mitigation mode may replace and/or override the normal operations. The unit 10 may remain in the power demand mitigation mode until DC current demand is below the predetermined threshold, such as by at least a margin to prevent continued movement between normal operation mode and power demand mitigation mode. Where the DC governor 30 determines that DC current demand is below the predetermined threshold, the DC governor 30 may continue with normal operations.

If the one or more power supplies reach their current limit, they may be configured to automatically shut off and be restarted.

Where the thermal governor 32 determines that the thermal management subsystem 20 is operating at a predetermined capacity threshold and internal temperatures, such as determined by the one or more sensors 24, are above a predetermined temperature threshold, the thermal governor 32 may initiate a temperature rise mitigation mode. Stated another way, the thermal management subsystem 20 may be performing at a maximum level for heat removal or some threshold thereof. For example, without limitation, the predetermined capacity threshold may be between 80-100% of the capacity of the thermal management subsystem 20 (e.g., fans operating at 80-100% of maximum speed), though any amount may be utilized. The predetermined temperature threshold may be the same or different for each sensor 24, such as based on location and/or tolerance of local components. In exemplary embodiments, without limitation, the internal temperature condition for entering the temperature rise mitigation mode may be met where any one of the internal temperatures are above the predetermined temperature threshold and/or the respective predetermined temperature threshold for the sensor 24. In other exemplary embodiments, without limitation, a plurality, or all, of the internal temperatures are above the predetermined temperature threshold and/or the respective predetermined temperature threshold for the sensor 24 before the temperature conditions for entering the temperature rise mitigation mode are met.

The temperature rise mitigation mode may comprise initiating a subroutine which comprises issuing commands, such as by way of the control subsystem 14, to the electronic displays 12 at a relatively slow pace, such as in a matter of minutes (e.g., between 5-60 minutes), begin reducing illumination levels of the electronic displays 12, such as by dimming the backlight, such as down to a zero level. This may reduce or prevent damage to temperature sensitive components of the unit 10. In this way, the temperature rise mitigation mode may replace and/or override the normal operations. The unit 10 may remain in the temperature rise mitigation mode until the internal temperatures and/or thermal management subsystem 20 capacity is below the respective predetermined thresholds, such as by at least a margin to prevent continued movement between normal operation mode and temperature rise mitigation mode. Where the thermal governor 32 determines that internal temperatures and/or thermal management subsystem 20 capacity are below the predetermined threshold, the thermal governor 32 may continue with normal operations.

These governors 28, 30, and 32 may be particularly important for preventing shut down of the units 10 and/or related components, such as the thermal management subsystems 20 which, if shut down, particularly in a moment of existing extreme operating conditions, may trigger a rapid rise in internal temperatures and comprise of the units 10. Thus, the governors 28, 30, and 32 and related operations may serve to maintain operations of the unit 10, such as the thermal management subsystem 20, and/or minimize disruption to user experiences.

The various predetermined thresholds and/or criteria for the governors 28, 30, and/or 32 may be set and/or varied by programming, such as by way of receipt of authenticated change commands from one or more remote electronic devices.

The governors 28, 30, and/or 32 may operate independently from one another, in exemplary embodiments without limitation. The analysis undertaken by each of the governors 28, 30, and/or 32 may be performed in parallel and/or in any sequence.

The integrated power governing features may alternatively, or additionally, permit the reduction in power supplies, such as of the power subsystem 16, for a unit 10 and/or reduce power consumption for a unit 10, among other benefits. This may allow provided power supplies, such as of the power subsystem 16, to operate closer to maximum capacity, whereby increased efficiencies are generally found, thereby increasing operational efficiency of the unit 10 and reducing costs of manufacture, among other benefits.

Figure 4:
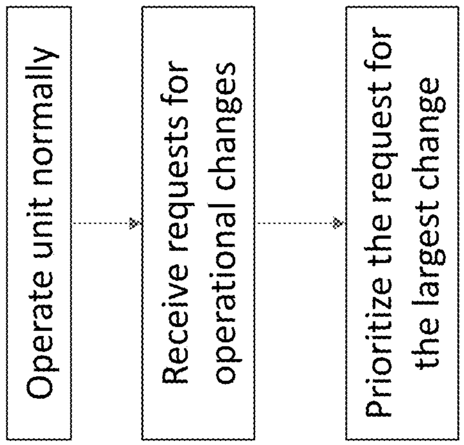
FIG. 4 is a flow chart with other exemplary logic for operating the unit of FIG. 1, such as when operating in the various environmental operation conditions illustrated by FIG. 2 and/or in conjunction with the logic of FIG. 3.

As illustrated with particular regard to FIG. 4, requests for operational changes may be prioritized and/or centralized for disposition. For example, without limitation, operational change requests made by the governors 28, 30, and/or 32 may be centrally dispositioned, such as at the control subsystem 14. Alternatively, or additionally, the governors 28, 30, and/or 32 may be in intercommunication and/or communication with a particular one of the governors 28, 30, and/or 32 which may be designated for arbitrating and/or prioritizing incoming requests. Where multiple requests for operational changes are received, such as from the different governors 28, 30, and/or 32 at the control subsystem 14, the control subsystem 14 or other dispositioning unit (e.g., designated one of the governors 28, 30, and/or 32) may be configured to prioritize the requests based on an amount of operational adjustment requested. For example, the largest operational change may be prioritized over the other requests. In exemplary embodiments, this may require acting on the request which results in the largest power and/or electronic display 12 illumination level reduction.

The remaining requests may be discarded, ignored, and/or placed on hold. The remaining requests may be acted on subsequently, such as when the particular request being acted on is no longer valid, and/or the requests may be discarded as the various requests become no longer valid. For example, without limitation, the highest prioritized request may comprise the largest illumination level reduction which may be sufficient to request the lower-level requests. As another example, without limitation, once the highest prioritized request is performed for a period of time, the request may drop off due to sufficient changes to operational conditions that render the request no longer needed, and the control subsystem 14, for example, may move to a secondary request, tertiary request, etc. which remain valid based on updated operating conditions.

While three specific governors 28, 30, and/or 32 may be utilized in exemplary embodiments, one or more additional governors 31 may optionally be utilized in place of, or in addition to, the governors 28, 30, and/or 32. For example, without limitation, one of the additional governors 31 may be configured to trigger electronic display 12 dimming and/or other power consumption reduction efforts where one or more operational failures in the thermal management system 20 are detected. For example, without limitation, where one or more fan failures are detected. Such operational failures may be detected through lack of signal response, lack of power supply, combinations thereof, or the like. In other exemplary embodiments, without limitation, one of the additional governors 31 may be configured to trigger electronic display 12 dimming and/or other power consumption reduction efforts where external power supply changes or ceases, such as from one or more solar panels, utility power supplies, wind turbines, combinations thereof, or the like.

Any embodiment of the present invention may include any of the features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention.

Certain operations described herein may be performed by one or more electronic devices. Each electronic device may comprise one or more processors, electronic storage devices, executable software instructions, combinations thereof, and the like, configured to perform the operations described herein. The electronic devices may be general purpose computers or specialized computing devices. The electronic devices may comprise personal computers, smartphones, tablets, databases, servers, or the like. The electronic connections and transmissions described herein may be accomplished by wired or wireless means. The computerized hardware, software, components, systems, steps, methods, and/or processes described herein may serve to improve the speed of the computerized hardware, software, systems, steps, methods, and/or processes described herein. The electronic devices, including but not necessarily limited to the electronic storage devices, databases, controllers, or the like, may comprise and/or be configured to hold solely non-transitory signals.

What is claimed is:

1. A display unit for prioritizing requested operational updates, said display unit comprising:
- an electronic display;
- a thermal management subsystem;
- one or more sensors; and
- a control subsystem in electronic communication with the electronic display, the one or more sensors, and the thermal management subsystem, where the control subsystem comprises one or more non-transitory electronic storage devices with software instructions, which when executed, configure one or more processors to:
  - operate the display unit based on operational parameters which are specific to readings from the one or more sensors;
  - receive requests to update the operational parameters for the display unit;
  - for each of the requests, determine a change in value to an associated one or ones of the operational parameters or an expected change in energy consumption for the display unit if the respective request were implemented; and prioritize the requests for implementation based on the change in value or the expected change in energy consumption.

2. The display unit of claim 1 wherein:

the software instructions, when executed, configure the one or more processors to: for each of the requests, determine the change in value to the associated one or ones of the operational parameters or the expected change in energy consumption for the display unit if the respective request were implemented on an absolute basis.

3. The display unit of claim 1 wherein:

the software instructions, when executed, configure the one or more processors to: implement the requests in accordance with the prioritization.

4. The display unit of claim 1 wherein:

the software instructions, when executed, configure the one or more processors to: discard or ignore all of the requests aside from a highest prioritized one of the requests.

5. The display unit of claim 1 wherein:

the operational parameters in the requests comprise illumination setpoints for the electronic display.

6. The display unit of claim 5 wherein:

the one or more sensors comprise at least one ambient light sensor; and the illumination setpoints are specific to ambient light readings from the at least one ambient light sensor.

7. The display unit of claim 5 wherein:

the one or more sensors comprise at least one temperature light sensor; and the illumination setpoints are specific to temperature readings from the at least one temperature sensor.

8. The display unit of claim 5 wherein:

the electronic display comprises a directly backlit liquid crystal display (LCD).

9. The display unit of claim 1 wherein:

the operational parameters in the requests comprise setpoints for the thermal management subsystem.

10. The display unit of claim 9 wherein:

the one or more sensors comprise at least one temperature sensor; and the setpoints are specific to temperature readings from the at least one temperature sensor.

11. The display unit of claim 10 wherein:

the thermal management subsystem comprises one or more fans; and the setpoints comprise fan speeds levels.

12. The display unit of claim 11 wherein:

the one or more fans comprise a plurality of fans; and the setpoints are different for at least some of the fans.

13. The display unit of claim 10 wherein:

the at least one temperature sensor comprises a plurality of temperature sensors spaced apart within the display unit; and the setpoints are different for at least some of the temperature sensors.

14. The display unit of claim 1 wherein:

the control subsystem comprises at least one of: an alternating current (AC) governor, a direct current (DC) governor, and a thermal governor; and the software instructions, when executed, configure the one or more processors to: assign each of the requests to a respective one of the governors for execution.

15. The display unit of claim 1 wherein:

the software instructions, when executed, configure the one or more processors to:

receive readings from the one or more sensors; and operate the display unit in accordance with the readings and the operational parameters.

16. A display unit for prioritizing requested operational updates, said display unit comprising:

an electronic display;

a thermal management subsystem;

one or more sensors; and a control subsystem in electronic communication with the electronic display, the one or more sensors, and the thermal management subsystem, where the control subsystem comprises one or more non-transitory electronic storage devices with software instructions, which when executed, configure one or more processors to:

operate the display unit based on operational parameters which are specific to readings from the one or more sensors;

receive requests to update the operational parameters for the display unit;

prioritize the requests for implementation; and discard or ignore the requests aside from a highest prioritized one of the requests.

17. A display unit for prioritizing requested operational updates, said display unit comprising: an electronic display; a thermal management subsystem; one or more sensors; and a control subsystem in electronic communication with the electronic display, the one or more sensors, and the thermal management subsystem, where the control subsystem comprises one or more non-transitory electronic storage devices with software instructions, which when executed, configure one or more processors to: operate the display unit based on operational parameters which are specific to readings from the one or more sensors; receive requests to update the operational parameters for the display unit, wherein the operational parameters in the requests comprise illumination setpoints for the electronic display or setpoints for the thermal management subsystem; and prioritize the requests for implementation by magnitude of proposed change.

* * * * *